Patented Apr. 27, 1948

2,440,358

UNITED STATES PATENT OFFICE 2,440,358

PROCESS AND CULTURE MEDIA FOR PRODUCING PENICILLIN

Otto K. Behrens and Reuben G. Jones, Indianapolis, Ind., assignors to Eli Lilly and Company, Indianapolis, Ind., a corporation of Indiana No Drawing. Application August 24, 1945, Serial No. 612,529

7 Claims. (Cl. 195—36)

This invention relates to penicillin and more particularly to improvements in the production thereof.

An object of this invention is to provide a process whereby the production and yield of penicillin may be improved. Other objects will be apparent from the disclosures herein made.

Penicillin, a material produced by a Penicillium mold of the notatum-chrysogenum group, has become widely known within recent years for its remarkable therapeutic properties as an antibacterial agent.

The availability of penicillin has been retarded by the circumstances of its production. The penicillin formed, presumably as a metabolic product, by the growth of the mold under suitable conditions, has been produced slowly and in very small quantity. Furthermore, the mold has produced other products, chemically similar to penicillin, but without potent antibacterial properties. Thus the small quantity of penicillin and the presence of structurally similar compounds has rendered its isolation difficult.

One of the methods which has been employed commercially for the production of penicillin is that known as surface culture. In a common adaptation of this method a liquid nutrient medium is supplied to a large number of bottles which are supported in a substantially horizontal position. The nutrient medium is then inoculated with the Penicillium mold and the mold grows on the surface of the nutrient medium. In order to produce commercial quantities of penicillin by this method a large number of bottles is required and individual handling is necessary.

Another process which has been commercialized to some extent is that known as the bran process wherein Penicillium mold is grown on bran. The bran may be spread in thin layers on trays or may be agitated continuously in rotating drums. While the bran itself is a nutrient for the growth of the mold, it is common to associate additional nutrient materials therewith.

Probably the most widely used process at the present time for the production of penicillin is that ordinarily referred to as submerged or deep culture. The submerged culture process involves the growth of Penicillium mold in an aqueous nutrient medium and accompanied customarily by agitation. When the submerged culture process is carried out in small vessels such as flasks of relatively small capacity, the process is frequently referred to as the "shake" culture process because the agitation is brought about by continuously shaking the culture by suitable mechanical means. When containers of larger capacity are employed, and such containers may have capacities running into the thousands of gallons, the agitation of the liquid nutrient medium is ordinarily accomplished in part by mechanical stirring and in part by aeration, which latter functions primarily to supply oxygen for the growth of the mold.

All of the above processes have been characterized in general by the slow production, and low yield, of penicillin.

By our invention the production of penicillin by a Penicillium mold of the notatum-chrysogenum group may be accelerated and the yield of penicillin increased.

According to the present invention penicillin is produced by growing a Penicillium mold of the notatum-chrysogenum group in a culture medium in the presence of the phenylacetyl compound, N-(2-aminoethyl)-phenylacetamide, which may be represented by the formula

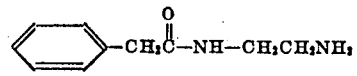

and the acid addition salts thereof. According to a preferred method the Penicillium mold and the phenylacetyl compound as represented above are associated with an aqueous culture medium containing nutrient material suitable for the growth and development of the mold, and the mold is grown under penicillin-producing conditions. The phenylacetyl compound is incorporated in the nutrient medium in effective amount less than about 1 percent and preferably less than about 0.3 percent. The amount of material which accelerates the production of penicillin may accordingly be present in relatively small amount although over a substantial range. For example, the method may be effectively carried out by associating about 0.015 percent of N-(2-aminoethyl) - phenylacetamide and the Penicillium mold with a culture medium containing mold-growth-supporting material, and under similar conditions there may be satisfactorily employed both larger and smaller amounts of N-(2-aminoethyl)-phenylacetamide.

In another aspect there is provided by this invention, a culture medium comprising a mold-growth-supporting material and a phenylacetyl compound as set forth in the next preceding paragraph. In a preferred form the culture medium may comprise water, mold-growth-supporting material, and, in amount effective to accelerate the production of penicillin and less than about 1 percent and preferably less than about 0.3 percent, a phenylacetyl compound as described. The amount of the compound which accelerates the production of penicillin may vary substantially throughout the range indicated above. By way of example, the culture medium may contain about 0.014 percent of N-(2-aminoethyl)-phenylacetamide or about 0.017 percent of N-(2-aminoethyl)-phenylacetamide hydrochloride.

This invention will now be described in detail in its present preferred application to the submerged culture process of producing penicillin.

In the submerged culture process, the culture medium comprises water and mold-growth-supporting material. The nutrient material may consist of ingredients known to those skilled in the art. A prominent constituent of one type of suitable nutrient material is that known as corn steep solids which is a by-product obtained in the manufacture of corn starch. Corn steep solids is a desirable material because of its low cost and its effectiveness in bringing about a relatively high yield of penicillin. On the other hand corn steep solids is of indeterminate chemical composition, some ingredients of which may make more difficult the isolation of the penicillin produced during the growth of the mold. With a major constituent such as corn steep solids there are ordinarily associated additional ingredients known to the art such as corn sugar, lactose, and salts such as calcium carbonate and zinc sulfate. The exact function of the various ingredients is not known in detail, but it is known to those skilled in the art that the combination of such ingredients does not bring about the production of penicillin when a Penicillium mold of the notatum-chrysogenum group is grown in such a culture medium under suitable conditions.

Another type of aqueous culture medium includes water and nutrient substances which, as contrasted with corn steep solids, are of a determinate chemical composition. Such ingredients include lactose, dextrose, acetic acid and salts such as sodium nitrate, ammonium nitrate, potassium dihydrogen phosphate, and magnesium sulfate. Compositions of this type are advantageous in that penicillin frequently is more readily separated from the other constituents of the culture medium and other products of the growth of the mold.

The mold employed for the production of penicillin is a Penicillium mold of the notatum-chrysogenum group, and illustratively a strain of this mold suitable for the purposes of this invention is that known as strain N. R. R. L. 1976.

The phenylacetyl compound, namely N-(2-aminoethyl)-phenylacetamide, which may be employed for the purposes of this invention to accelerate the production of penicillin, may be employed in the form of its free base and also in the form of its acid addition salts such as the hydrochloride, hydrobromide, sulfate, phosphate, succinate and maleate salts, and such salts are included within the scope of this invention.

The amount of N-(2-aminoethyl)-phenylacetamide or salts thereof employed in carrying out the invention may vary to a substantial extent. The effective amount ranges up to about 10 grams per liter of culture medium, or in other words, up to about 1 percent on a weight-volume basis, although it is preferred to employ the phenylacetyl compound in an amount less than about 0.3 percent. The present optimum range when using, for example, N-(2-aminoethyl-phenylacetamide hydrochloride is about 0.017 percent. In general there is no particular advantage to be gained by employing an amount of the phenylacetyl compound in substantial excess of the amount effective in promoting the maximum production of penicillin by the mold.

The phenylacetyl compound may be associated with the mold and culture medium at any suitable time. Thus the materials of the culture medium upon association in a suitable container may be inoculated with the Penicillium mold, and the phenylacetyl compound may be incorporated either before or shortly after the inoculation with the mold.

The culture medium, with the mold, and the compound accelerating the production of penicillin, should be maintained at a suitable temperature, for example in the range of 20–30° C. A range of temperature which has been found to be particularly suitable is from 24–28° C. The period of time during which the mold is grown will depend upon the objective desired. Thus the mold may be grown only during the period of its maximum rate of growth. Under such conditions the mold growth may be interrupted after a period of growth of from two to three days. On the other hand the mold may be grown to obtain the maximum yield of penicillin. In such case the mold may be grown for a longer period, for example for about four or five days.

The penicillin may be separated from the culture medium in any suitable manner. For example the penicillin may be adsorbed on a surface-active carbon. Alternatively the penicillin may be extracted by means of a suitable water-immiscible organic solvent such as amyl acetate. By well-known extractive procedures, the penicillin subsequently may be isolated in dry form as a salt thereof, for example the sodium or calcium salt.

By the practice of this invention the yield of penicillin has been substantially increased. Thus under comparative conditions the yield of penicillin has been increased from 50 to upwards of 80 percent. This range is of course illustrative and lesser or greater yields are within the contemplation of the invention depending upon the conditions under which the penicillin is produced.

Specific examples further illustrating the invention particularly with respect to the deep culture process of producing penicillin are given below.

*Example 1*

A culture medium was prepared comprising the following constituents:

| | | |
|---|---|---|
| Corn steep solids | pounds | 500 |
| Corn sugar | do | 125 |
| Lactose | do | 500 |
| Calcium carbonate | do | 50 |
| Zinc sulfate heptahydrate | do | 1.0 |
| Water | gallons | 3,000 |

To the above culture medium were added about 3 pounds of N-(2-aminoethyl)-phenylacetamide equivalent on a weight-volume basis to 0.015 percent. The culture medium was inoculated with a Penicillium mold, strain N. R. R. L. 1976, and the mold was allowed to grow for 2½ days at 27° C. The penicillin produced in the above culture medium amounted to 79 Oxford units per cc. of culture medium.

By way of comparison a Penicillium mold of the same strain grown in the same culture medium under the same conditions including time and temperature as above except in the absence of the N-(2-aminoethyl)-phenylacetamide hydrochloride, produced penicillin to the extent of only 56 Oxford units per cc. of culture medium.

From the above it will be seen that an increase in production of penicillin to the extent of 41 percent was accomplished in carrying out the production of penicillin in accordance with this invention.

Example 2

A culture medium was prepared as follows:

| | |
|---|---|
| Lactose _____ grams__ | 35 |
| Corn steep solids _____ do____ | 20 |
| Zinc sulfate heptahydrate _____ do____ | 0.004 |
| M/50 phosphate buffer _ cubic centimeters__ | 5 |
| Water, q. s _____ do____ | 1,000 |

0.14 g. of N-(2-aminoethyl)-phenylacetamide, namely 0.014 percent on a weight-volume basis were added to the culture medium and the medium was inoculated with a Penicillium mold, strain N. R. R. L. 1976. The culture medium and mold were agitated continuously and the mold was permitted to grow for four days at 27° C. There was obtained penicillin to the extent of 196 Oxford units per cc. of culture medium.

By way of comparison, when the Penicillium mold was grown under the same conditions but in the absence of the N-(2-aminoethyl)-phenylacetamide, the yield of penicillin was 113 Oxford units per cc. of culture medium.

In the above examples "corn steep solids" has been included as a constituent of the culture medium. Corn steep solids assists in the obtaining of high yields of penicillin but due in part to the heterogeneous nature of the corn steep solids, difficulty is involved in the separation of penicillin from other constituents of the culture medium following the growth of the mold.

In the following examples the culture medium does not contain corn steep solids and is of more precise chemical composition. The employment of such culture medium may result in the production of a lower yield of penicillin. On the other hand, penicillin which is produced may be considerably more readily separated from the culture medium following the growth of the mold.

Example 3

A culture medium not embodying corn steep solids is as follows:

| | |
|---|---|
| Potassium dihydrogen phosphate _ grams__ | 1.0 |
| Dipotassium hydrogen phosphate ___ do____ | 1.0 |
| Magnesium sulfate heptahydrate __ do____ | 1.0 |
| Sodium nitrate _____ do____ | 2.0 |
| Lactose _____ do____ | 10.0 |
| Zinc sulfate heptahydrate _____ do____ | 0.01 |
| Water, q. s _____ cc__ | 2,000 |

(Adjusted to pH 6.5 with NaOH solution)

N-(2-aminoethyl)-phenylacetamide was incorporated in the above culture medium to the extent of 0.014 percent and the medium inoculated with a Penicillium mold, strain N. R. R. L. 1976.

The culture was mechanically agitated for three days and maintained at a temperature of about 27° C. Penicillin was then found to be present to the extent of 30 Oxford units per cc. of culture medium.

By way of comparison, under the same conditions except for the absence of N-(2-aminoethyl)-phenylacetamide, the penicillin produced was only 24 Oxford units per cc. of culture medium.

Example 4

Another example of a culture medium not embodying corn steep solids comprises the following composition:

| | | |
|---|---|---|
| Water _____ cc__ | | 1,000 |
| Lactose _____ grams__ | | 25.0 |
| Dextrose _____ do____ | | 5.0 |
| Sodium nitrate _____ do____ | | 5.0 |
| Ammonium nitrate _____ do____ | | 5.0 |
| Potassium dihydrogen phosphate _ do____ | | 1.0 |
| Magnesium sulfate _____ do____ | | 0.25 |
| Acetic acid _____ do____ | | 5.0 |

A culture medium of the above composition wherein were incorporated 0.02 percent of N-(2-aminoethyl)-phenylacetamide hydrochloride on a weight-volume basis, was inoculated with Penicillium mold strain N. R. R. L. 1976. The culture medium was mechanically agitated for 6 days and maintained at a temperature of about 27° C. Penicillin was produced to the extent of 85 Oxford units per cc. of culture medium.

By way of comparison, under the same conditions except for the absence of N-(2-aminoethyl)-phenylacetamide hydrochloride, penicillin was produced to the extent of only 54 Oxford units per cc. of culture medium.

For the purposes of convenience the preparation of compounds to be employed in carrying out this invention is given below:

Preparation of N-(2-aminoethyl)-phenylacetamide hydrochloride 164 g. of ethyl phenylacetate are mixed with 180 g. of ethylene diamine and the mixture heated at 100° C. for 36 hours. The unreacted ethyl phenylacetate and ethylene diamine, and the ethyl alcohol formed during the reaction are removed from the reaction mixture by heating the mixture to 70° C. and subjecting it to a vacuum, preferably below 20 mm. pressure. The residue is digested with hot toluene, filtered to remove the insoluble N,N'-di-phenylacetylethylenediamine, and the filtrate evaporated in vacuo to yield a residue of the desired N-(2-aminoethyl)-phenylacetamide. The residue is dissolved in 1 liter of a mixture of absolute ethyl alcohol and absolute ether and the solution saturated with dry hydrogen chloride gas. N-(2-aminoethyl)-phenylacetamide hydrochloride precipitates from the solution. It is separated by filtration and purified by recrystallization from ethyl alcohol. It melts at about 140–141° C.

Preparation of N-(2-aminoethyl)-phenylacetamide 21 g. of N-(2-aminoethyl)-phenylacetamide hydrochloride are dissolved in 50 cc. of water and a solution of 4 g. of sodium hydroxide in 10 cc. of water is added thereto. The mixture is extracted several times with ether, the combined ether extracts dried with potassium carbonate and the ether removed in vacuo leaving N-(2-aminoethyl)-phenylacetamide as a colorless oil.

What is claimed is:

1. The method of producing penicillin in submerged culture which comprises growing a Penicillium mold of the notatum-chrysogenum group in a culture medium in the presence of an effective amount less than about one percent of a member of the group consisting of N-(2-aminoethyl)-phenylacetamide represented by the formula

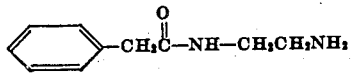

and acid addition salts thereof.

2. The improved method of obtaining penicillin in submerged culture which comprises providing an aqueous culture medium for the growth and development of a Penicillium mold of the notatum-chrysogenum group, associating with said culture medium a Penicillium mold of the notatum-chrysogenum group and an effective amount less than about one percent of a member of the group consisting of N-(2-aminoethyl)-phenylacetamide represented by the formula

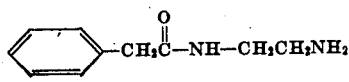

and acid addition salts thereof.

3. In the method of producing penicillin in submerged culture by growing a Penicillium mold of the notatum-chrysogenum group in association with a nutrient material, the improvement which comprises incorporating in the nutrient material, in effective amount less than about 1 percent, a member of the group consisting of N-(2-aminoethyl)-phenylacetamide represented by the formula

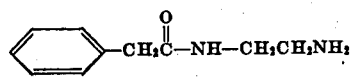

and acid addition salts thereof.

4. The improved method of producing penicillin in submerged culture which comprises providing a culture medium containing a nutrient material, and associating with said culture medium a Penicillium mold of the notatum-chrysogenum group and about 0.014 percent of N-(2-aminoethyl)-phenylacetamide represented by the formula.

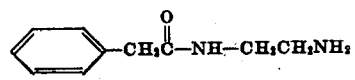

5. A culture medium for the production of penicillin in submerged culture through the growth of a Penicillium mold of the notatum-chrysogenum group, said culture medium comprising nutrient material and an effective amount less than about one percent of a member of the group consisting of N-(2-aminoethyl)-phenylacetamide represented by the formula

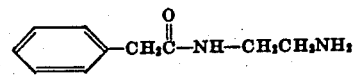

and acid addition salts thereof.

6. A culture medium for the production of penicillin in submerged culture through the growth of a Penicillium mold of the notatum-chrysogenum group, said culture medium comprising water, nutrient material and, in amount effective to accelerate the production of penicillin and less than about 1 percent, a member of the group consisting of N-(2-aminoethyl)-phenylacetamide represented by the formula

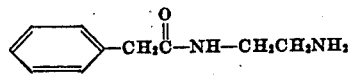

and acid addition salts thereof.

7. A culture medium for the production of penicillin in submerged culture through the growth of a Penicillium mold of the notatum-chrysogenum group, said culture medium comprising water, nutrient material dispersed in said water, and about 0.014 per cent of N-(2-aminoethyl)-phenlyacetamide represented by the formula

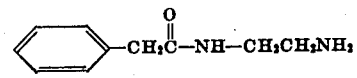

OTTO K. BEHRENS.
REUBEN G. JONES.

REFERENCES CITED

The following references are of record in the file of this patent:

Coghill, Monthly Progress Report No. 16, November 20, 1943. Distributed by Committee on Medical Research. OSBD, pages 1 and 2.

Pennsylvania State College, Penicillin Interim Report (45–124), March 30, 1945, page 1.